United States Patent
Leonard et al.

(10) Patent No.: US 7,784,771 B2
(45) Date of Patent: Aug. 31, 2010

(54) SPRING BODY FOR GAS SPRING ASSEMBLY AND METHOD OF FORMING SAME

(75) Inventors: Daniel J. Leonard, Oosterbeek (NL); Pradipta N. Moulik, Carmel, IN (US); Bradley W. Hayes, Noblesville, IN (US)

(73) Assignee: Firestone Industrial Products Company, LLC

( * ) Notice: Subject to any disclaimer, the term of this patent is extended or adjusted under 35 U.S.C. 154(b) by 0 days.

(21) Appl. No.: 12/197,487

(22) Filed: Aug. 25, 2008

(65) Prior Publication Data

US 2009/0057966 A1 Mar. 5, 2009

Related U.S. Application Data

(60) Provisional application No. 60/967,176, filed on Aug. 31, 2007.

(51) Int. Cl.
F16F 9/04 (2006.01)
(52) U.S. Cl. ........................ 267/64.27; 267/122
(58) Field of Classification Search ... 267/64.21–64.27, 267/148, 149
See application file for complete search history.

(56) References Cited

U.S. PATENT DOCUMENTS

| | | | | |
|---|---|---|---|---|
| 2,800,165 A * | 7/1957 | Talalay et al. | ............... | 267/145 |
| 3,321,200 A * | 5/1967 | Polhemus et al. | ........ | 267/64.27 |
| 3,897,941 A * | 8/1975 | Hirtreiter et al. | ......... | 267/64.24 |
| 4,293,017 A * | 10/1981 | Lambe | ..................... | 152/339.1 |
| 4,555,096 A * | 11/1985 | Pryor | ....................... | 267/64.21 |
| 5,060,916 A * | 10/1991 | Koschinat et al. | ........ | 267/64.27 |
| 5,346,187 A * | 9/1994 | Drescher | ................. | 267/64.11 |
| 5,413,316 A * | 5/1995 | Easter | ..................... | 267/64.24 |
| 5,566,929 A * | 10/1996 | Thurow | ................... | 267/64.24 |
| 5,580,033 A * | 12/1996 | Burkley et al. | ........... | 267/64.27 |
| 6,250,613 B1 * | 6/2001 | Koeske et al. | ................. | 267/66 |
| 6,264,178 B1 * | 7/2001 | Schisler et al. | ........... | 267/64.27 |
| 6,460,836 B1 | 10/2002 | Trowbridge | | |
| 6,719,279 B1 * | 4/2004 | Koch et al. | ............... | 267/64.27 |
| 7,063,308 B2 * | 6/2006 | Binder | ..................... | 267/64.27 |
| 2003/0102612 A1 * | 6/2003 | Branco et al. | ............ | 267/64.24 |
| 2007/0205546 A1 * | 9/2007 | Watanabe et al. | ........ | 267/64.27 |

FOREIGN PATENT DOCUMENTS

| | | |
|---|---|---|
| JP | 8-284997 | 11/1996 |
| JP | 2005-048933 | 2/2005 |
| WO | WO 2007-018031 | 2/2007 |

OTHER PUBLICATIONS

WO 2009/032580 A3—International Search Report.

* cited by examiner

*Primary Examiner*—Christopher P Schwartz
(74) *Attorney, Agent, or Firm*—Thomas R. Kingsbury; Matthew Dugan (57) ABSTRACT

A spring body includes a filament structure formed from at least one length of filament material. An elastomeric wall at least partially defines a spring chamber and includes a first portion of the filament structure. A comparatively-rigid wall includes a second portion of the filament structure. A gas spring assembly that includes such a spring body, as well as a method making a spring body and a method of making a gas spring assembly are also included.

24 Claims, 6 Drawing Sheets

SPRING BODY FOR GAS SPRING ASSEMBLY AND METHOD OF FORMING SAME

This application claims priority from U.S. Provisional Patent Application No. 60/967,176 filed on Aug. 31, 2007, which is hereby incorporated herein by reference in its entirety.

BACKGROUND

The present disclosure broadly relates to the art of spring devices and, more particularly, to a spring body that includes an elastomeric wall and a comparatively rigid wall with a filament structure extending within at least a portion of the elastomeric and rigid walls. A gas spring device including such a spring body and a method of forming such a spring body are also included.

Gas spring assemblies of a variety of types and kinds are known and commonly used to support a sprung mass on an unsprung mass, such as supporting a body or chassis of a vehicle on an axle or other wheel-engaging member, for example. One common gas spring construction includes an elastomeric or otherwise flexible wall that is secured between comparatively rigid end members to at least partially form a spring chamber therebetween. Typically, the flexible wall extends between opposing open ends thereof. The end members are typically formed separately from the flexible wall and are then secured to different ones of the open ends using any one of a variety of known mechanical connections.

Notwithstanding the substantial success and widespread usage of such conventional gas spring constructions, certain areas of improvement in the art of gas spring assemblies still remain. One such area involves the reduction of manufacturing, inventory and assembly costs associated with the production of known gas springs assemblies.

More specifically, it is common knowledge that the flexible wall of conventional gas spring constructions is normally formed from a material (e.g., rubber) that is different from the material (e.g., metal or rigid plastic) that is used to form the end members of such conventional gas spring constructions. As such, these parts are manufactured separately from one another and then connected together to form the gas spring assembly. In assembling the components, a rigid mechanical connection (e.g., roll-crimp, swage or threadably secured component) is normally utilized to form and maintain a substantive fluid-tight seal between the flexible wall and each of the end members. However, it has been recognized that costs associated with manufacturing and inventorying such individual components, as well as those costs associated with the assembly thereof, undesirably increase the overall cost of producing such gas spring assemblies.

Additionally, in many conventional gas spring constructions, the opposing end members are themselves often formed from dissimilar materials (e.g., one end member from metal and one end member from plastic). In such arrangements, different mechanical connections are commonly used for securement of each end member. Thus, the aforementioned costs may be further increased as the complexity of the gas spring assembly increases relative to more basic constructions.

Accordingly, it is believed desirable to develop a gas spring body for use in forming a gas spring assembly that overcomes the foregoing and other disadvantageous qualities and/or characteristics.

BRIEF DESCRIPTION

A gas spring body in accordance with the present disclosure is provided that includes a filament structure formed from at least one length of filament material. The filament structure has a longitudinally-extending axis formed between opposing ends. A flexible wall at least partially defines a spring chamber and includes inner and outer wall surfaces. The flexible wall is formed from a quantity of elastomeric material and a first portion of the filament structure such that the first portion of the filament structure is disposed in the flexible wall between the inner and outer surfaces thereof. A substantially-rigid wall includes inner and outer wall surfaces. The substantially-rigid wall is formed from a quantity of comparatively-rigid material and a second portion of the filament structure such that the second portion of the filament structure is disposed in the substantially-rigid wall between the inner and outer wall surfaces thereof.

A gas spring assembly in accordance with the present disclosure is provided that includes a first end member, a second end member spaced from the first end member and an elastomeric wall disposed between the first and second end members about a longitudinal axis extending therebetween. The elastomeric wall at least partially forms a spring chamber. A filament structure is formed from at least one length of filament material. The filament structure is disposed about the axis and has longitudinally spaced first and second ends. A first portion of the filament structure is disposed along at least a portion of the first end member and a second portion of the filament structure is disposed along at least a portion of the elastomeric wall.

A method of forming a gas spring body in accordance with the present disclosure is provided that includes generating a filament structure from at least one length of filament material. The filament structure has a longitudinally-extending axis and first and second axially-spaced ends. The method also includes forming a flexible wall of the gas spring body from a quantity of elastomeric material and a first portion of the filament structure. The flexible wall at least partially defines a spring chamber and includes opposing wall surfaces with the first portion of the filament structure disposed between the opposing wall surfaces and operative to reinforce the flexible wall of the gas spring body. The method further includes forming a rigid wall from a quantity of substantially-rigid material and a second portion of the filament structure. The rigid wall includes opposing wall surfaces with the second portion of the filament structure disposed between the opposing wall surfaces and operative to reinforce the rigid wall of the gas spring body.

A method of manufacturing a gas spring assembly in accordance with the present disclosure is provided that includes generating a filament structure from at least one length of filament material. The filament structure has a longitudinally-extending central axis. The filament structure extends about the axis and extends longitudinally between opposing first and second structure ends. The method also includes forming a first rigid wall over a first portion of the filament structure. The first rigid wall is operative to at least partially form a first end member of the gas spring assembly and includes an inner wall surface and an outer wall surface. The method further includes forming an elastomeric wall over at least a second portion of the filament structure. The elastomeric wall at least partially defines a spring chamber and an open end opposite the first rigid wall. The method also includes forming a substantially fluid-tight seal between the first rigid wall and the elastomeric wall. The method further includes enclosing the spring chamber to form a substantially fluid-tight volume within the gas spring assembly.

DETAILED DESCRIPTION

Turning, now, to the drawings, wherein the showings are for the purpose of illustrating exemplary embodiments of the present disclosure and which are not intended as a limitation of the same, gas spring assemblies that include a spring body in accordance with the present disclosure are shown in FIGS. 1-5. Broadly, a spring body according to the present disclosure includes an elastomeric wall (which may alternately be referred to herein as a wall portion and/or wall section) and at least one comparatively rigid wall (which may alternately be referred to herein as a wall portion and/or wall section) as well as a filament structure that extends into or is otherwise disposed within at least a portion of the elastomeric wall and at least a portion of the at least one rigid wall.

Figure 1:
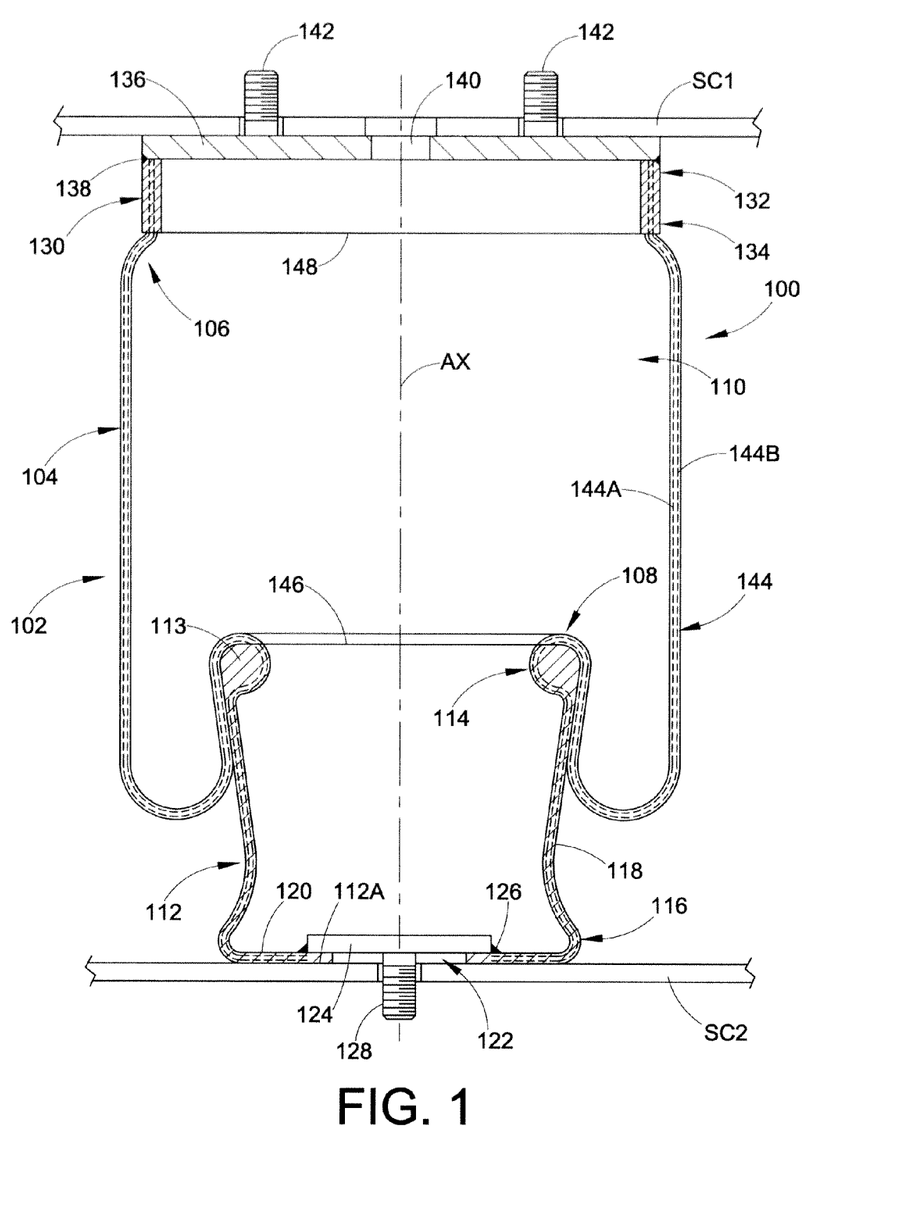
FIG. 1 is a cross-sectional side view of one exemplary embodiment of a gas spring assembly in accordance with the present novel concept.

As with conventional gas spring assemblies, a gas spring assembly that includes a spring body in accordance with the present disclosure will generally include opposing end members that are suitable for abuttingly engaging associated structural components, such as spaced structural components SC1 and SC2 which are shown in FIG. 1, for example. Accordingly, the one or more rigid walls of a spring body in accordance with the present disclosure can take the form of or otherwise be used as end members of a gas spring assembly. Alternately, one or more additional elements, components and/or structures can be secured or otherwise attached to the at least one rigid wall for use in forming an end member of a gas spring assembly. As an example, one rigid wall of a gas spring assembly could take the form of or otherwise operate as an end closure of a gas spring assembly. The rigid wall could then be received on and suitably secured to an additional component, such as an otherwise convention piston, for example, to at least partially form the gas spring assembly. Additionally, it will be appreciated that the associated structural components can be of any suitable type, kind and/or construction, such as, for example, spaced-apart components of a vehicle or vehicle suspension system.

With reference to FIG. 1, one exemplary embodiment of a gas spring assembly 100 is shown that includes a spring body 102 in accordance with the present disclosure. The spring body includes an elastomeric or otherwise substantially flexible spring wall 104 (which may alternately be referred to herein as a wall portion and/or wall section) that extends generally longitudinally between first and second elastomeric wall ends 106 and 108 such that a central axis AX can be established therebetween. Elastomeric wall section 104 extends circumferentially about axis AX and at least partially defines a spring chamber 110. Spring body 102 also includes a first rigid wall 112 (which may alternately be referred to herein as a wall portion and/or wall section) that is disposed along second elastomeric wall end 108 and extends between opposing first and second rigid wall ends 114 and 116 with second elastomeric wall end 108 and first rigid wall end 114 being adjacent one another.

In the exemplary embodiment shown in FIG. 1, first rigid wall 112 includes a side wall portion 118 that extends generally longitudinally along axis AX. First rigid wall 112 also includes an end wall portion 120 that extends approximately transverse to axis AX. Additionally, an opening 122 is provided in end wall portion 120 and a first cover or end plate 124 is disposed within spring chamber 110. The cover can be positioned along end wall portion 120 across opening 122 and secured to the end wall portion in a manner suitable for forming a substantially fluid-tight seal therewith, such as by using a welded joint 126, for example. One or more securement devices and/or features can be provided on or along first rigid wall 112 in any suitable manner. For example, a threaded stud 128 can be affixed to or otherwise extend from along first end plate 124 and project through an associated structural feature, such as structural component SC2, for example, for receiving a complimentary securement device, such as a threaded nut (not shown), for example.

As discussed above, a spring body according to the present disclosure can optionally include more than one rigid wall portion. In the exemplary embodiment shown in FIG. 1, spring body 102 is shown as including a second rigid wall 130 (which may alternately be referred to herein as a wall portion and/or wall section) that is disposed along first elastomeric wall end 106 and extends between opposing third and fourth rigid wall ends 132 and 134 with first elastomeric wall end 106 and second rigid wall end 134 being adjacent one another.

Unlike first rigid wall 112, second rigid wall 130 is not operative as an end member of the gas spring assembly that would be capable of engaging an associated structural component, such as structural component SC1, for example. Rather, second rigid wall 130 forms an open end of spring body 102. A second cover or end plate 136 is positioned across the open end of the spring body and can be secured to second rigid wall 130 in any manner suitable for forming a substantially fluid-tight seal therebetween, such as by using a welded joint 138, for example. The second cover plate is shown as including a suitable fluid passage 140 for communication of pressurized gas and/or other fluids to and from spring chamber 110. Additionally, one or more securement devices and/or features can be provided on or along second end plate 136 in any suitable manner. For example, threaded fasteners 142 can be affixed to or otherwise provided along second end plate 136 and extend through an associated structural member, such as structural component SC1, for example, for receiving a complimentary securement device, such as a threaded nut (not shown), for example.

Additionally, a spring body in accordance with the present disclosure also includes a filament structure that extends within at least a portion of the elastomeric wall section and within at least a portion of at least one rigid wall section. In the exemplary embodiment shown in FIG. 1, a filament structure 144 is disposed within elastomeric wall section 104 and extends respectively from the first and second elastomeric ends 106 and 108 into first and second rigid wall sections 112 and 130. As shown in FIG. 1, filament structure 144 extends the full length of elastomeric wall section 104 as well as the full length of second rigid wall section 130. However, filament structure 144 is shown in FIG. 1 as extending only partially along first rigid wall section 112, such that an unreinforced portion 112A is formed near opening 122.

Filament structure 144 can be of any suitable type, kind, construction and/or configuration, and can be formed from any suitable material or combination of materials that are capable of forming a filament structure for reinforcing at least portions of the spring body. For example, filament structure 144 can be formed from any number of one or more filaments that are wound, laid or otherwise disposed in any suitable configuration, arrangement, shape and/or having any desired profile, such as a plurality of filaments laid in two or more cross-biased plies 144A and 144B or a single filament wound in a geodesic pattern, for example. As another example, the filament structure could optionally include one or more overlapping portions or filament structure seams extending longitudinally or otherwise along the filament structure. Additionally, the one or more filaments that are used to form the filament structure can of any suitable type, construction and/or material, such as monofilament polymeric strands, braided cotton yarn or bundled carbon fibers, for example. Furthermore, such one or more filaments could optionally be coated or otherwise treated, such as, for example, to improve adhesion with the elastomeric and/or rigid material. For example, the filament material could be rubber coated, such that upon applying a layer of rubber over the filament material improved adhesion between the various layers could result during and/or after vulcanization, for example.

An elastomeric wall, such as elastomeric wall section 104, for example, and one or more rigid walls, such as rigid wall sections 112 and 130, for example, can be formed from any material or combination of materials that are suitable for providing the desired performance characteristics of the respective wall sections. Thus, a single material could be used with the different wall sections having varying thicknesses and/or other geometric features or characteristics to provide the desired variations in performance. Additionally, or in the alternative, different materials could be used for the different wall sections. For example, elastomeric wall section 104 can be formed from any suitable elastomeric or otherwise substantially flexible material, such as natural rubber, synthetic rubber or a flexible thermoplastic elastomer. Rigid wall sections 112 and 130 could then be formed from any one or more comparatively rigid materials, such as one or more comparatively rigid thermoplastics or thermoplastic elastomers, for example.

In one exemplary combination of materials, the elastomeric wall can be formed from a material having a flexural modulus of less than approximately 10,000 psi and the one or more comparatively rigid walls can be formed from one or more materials that have a flexural modulus of greater than approximately 20,000 psi. For example, the elastomeric wall section could be formed from a less-stiff elastomeric polyurethane resin, and one or more of the comparatively rigid walls could be formed from a more-stiff elastomeric polyurethane resin. It will be appreciated, however, that any other material, combinations of materials and/or variations in wall shape and/or configuration could alternately be used.

A spring body in accordance with the present disclosure, such as spring body 102, for example, at least partially forms a spring chamber, such as spring chamber 110, for example. As such, it is desirable for any seams or connections between adjacent wall sections, such as seams 146 and 148, which are respectively formed between elastomeric wall section 104 and rigid wall sections 112 and 130, to form or establish a substantially fluid-tight seal between the adjacent wall sections. It will be appreciated that such a substantially fluid-tight seal can be formed in any suitable manner. For example, such adjacent wall sections can be positioned in proximity to or abutting engagement with one another and a sealing compound, such as a sealant, adhesive and/or epoxy, for example, could be disposed along the proximal or abutting areas to form a substantially fluid-tight seal therebetween. As another example, the wall sections could be formed from a common family of materials (e.g., two different grades of the same polymeric material) with one wall section being molded (or otherwise formed) onto another wall section, such that the complimentary materials melt together during the molding process (or other operation) to thereby adhere the materials together and form a substantially fluid-tight seal therebetween.

Additionally, it will be appreciated that in some cases it may be desirable to ensure that the elastomeric wall section of the spring body is not flexed or otherwise deflected beyond a given minimum bend radius. It will be recognized that any such minimum bend radius will vary from application-to-application depending upon a variety of factors and/or criteria, such as materials, wall construction and/or usage, for example. In cases in which it is desirable to maintain the filament structure of the spring body (e.g., filament structure 144 of spring body 102) approximately equal to or larger than a given minimum bend radius, a radius-maintaining feature or component can be included on or along the spring body or can be separately provided. In the exemplary embodiment shown, rigid wall section 112 includes a radius-maintaining bead 113 disposed along first rigid end 114. As shown in FIG. 1, filament structure 144 extends radially-inwardly along radius-maintaining bead 113 such that a minimum radius can be maintained in the filament structure as the same transitions through seam 148 and into and along elastomeric wall portion 104. It will be appreciated, however, that the embodiment shown is merely exemplary and that any other suitable arrangement and/or configuration could alternately be used.

Gas spring assembly 100 is shown in FIG. 1 as being of a rolling lobe-type configuration in which second end plate 136 is operative as one end member of the gas spring assembly and first rigid wall 112 is operative as a second end member or piston of the gas spring assembly. Thus, as shown in FIG. 1, elastomeric wall portion 104 is adapted to roll along side wall portion 118 of first rigid wall 112 in an otherwise generally conventional manner during use in operation. It will be appreciated, however, that in another exemplary embodiment, the first rigid wall could take the form of a different end structure, such as an end closure, for example, and that a suitable end member, such as an otherwise conventional piston, for example, could be separately provided and secured on or along the first rigid wall.

Figure 2:
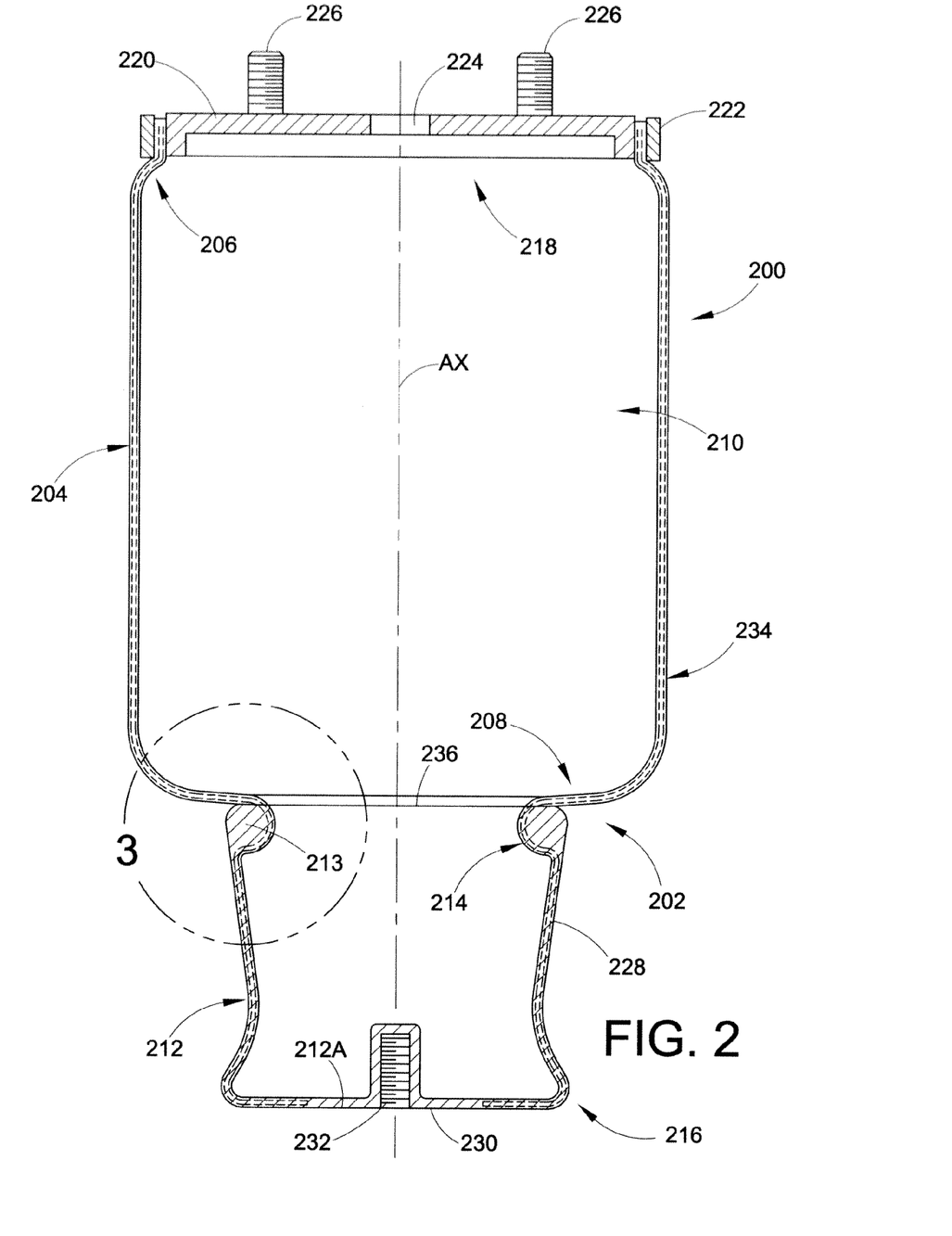
FIG. 2 is a cross-sectional side view of another exemplary embodiment of a gas spring assembly in accordance with the present novel concept.

Another exemplary embodiment of a gas spring assembly 200 that includes a spring body 202 in accordance with the present disclosure is shown in FIG. 2. Spring body 202 includes an elastomeric wall 204 (which may alternately be referred to herein as a wall portion and/or wall section) that extends generally longitudinally between first and second elastomeric wall ends 206 and 208, such that a central axis AX can be established therebetween. Elastomeric wall section 204 extends circumferentially about axis AX and at least partially defines a spring chamber 210. Spring body 202 also includes a rigid wall 212 (which may alternately be referred to herein as a wall portion and/or wall section) that is disposed along second elastomeric wall end 208 and which extends between opposing first and second rigid wall ends 214 and 216 with second elastomeric wall end 208 and a first rigid wall end 214 being adjacent one another. Optionally, a radius-maintaining feature or component can be included on or along the gas spring assembly and/or the spring body thereof, as discussed above. In the exemplary embodiment shown in FIGS. 2 and 3, a radius-maintaining bead 213 is provided along rigid wall end 214.

Spring body 202 differs from spring body 102, discussed above, in that only one rigid wall is included in spring body 202. As such, first elastomeric wall end 206 of elastomeric wall section 204 forms an opening 218 that is suitable for receiving or otherwise engaging an associated end member, such as an end plate 220, for example. Thus, first elastomeric wall end 206 can be secured to an associated end member in any manner suitable for forming a substantially fluid-tight seal therewith. For example, a retaining member 222 can be provided along first elastomeric wall end 206 and can be radially-inwardly deformed to secure the elastomeric wall section along end plate 220. Additionally, the associated end member can optionally include any other suitable features or components. For example, end plate 220 can include a fluid passage 224 extending therethrough that is suitable for permitting fluid communication with spring chamber 210. End plate 220 can also include one or more securement devices or features, such as threaded studs 226, for example, for securing the gas spring assembly on or along an associated structural component, such as structural component SC1 in FIG. 1, for example.

Rigid wall 212 includes a side wall portion 228 that extends generally longitudinally along axis AX and an end wall portion 230 that extends approximately transverse to axis AX. Rather than including an opening, such as is shown in FIG. 1, for example, end wall portion 230 of rigid wall section 212 can form a closed end of the spring body and can optionally include one or more securement features, such as a threaded hole 232, for example, which can be supported thereon or integrally-formed thereinto.

As discussed above with regard to spring body 102, spring body 202 also includes a filament structure that extends within at least a portion of the elastomeric wall section and within at least a portion of at least one rigid wall section. In the exemplary embodiment shown in FIG. 2, a filament structure 234 is disposed within elastomeric wall section 204 and extends from second elastomeric end 208 into rigid wall section 212. As shown in FIG. 2, filament structure 234 extends the full length of elastomeric wall section 204 but extends only partially along the length of rigid wall section 212, such that an unreinforced portion 212A is formed near threaded hole 232.

Additionally, as discussed above with regard to filament structure 144, filament structure 234 can be of any suitable type, kind, construction (e.g., with or without overlaps or filament structure seams) and/or configuration, and can be formed from any suitable material or combination of materials that are capable of forming a filament structure for reinforcing at least portions of the spring body. What's more, filament structure 234 can be formed from any number of one or more filaments that are wound or otherwise disposed in any suitable arrangement, shape or having any desired profile, such as a plurality of filaments laid in two or more cross-biased plies 234A and 234B (FIG. 3) or a single filament wound in a geodesic pattern, for example. Additionally, the one or more filaments that are used to form the filament structure can of any suitable type, construction and/or material, such as monofilament polymeric strands, braided cotton yarn or bundled carbon fibers, for example. Furthermore, such one or more filaments could optionally be coated or otherwise treated, such as to improve adhesion with the elastomeric and/or rigid material, for example.

As has been also discussed above with regard to spring body 102, spring body 202 can be formed from any material or combination of materials that are suitable for providing the desired performance characteristics of the respective wall sections. Thus, a single material could be used with the different wall sections having varying thicknesses and/or other geometric features or characteristics to provide the desired variations in performance. Additionally, or in the alternative, different materials could be used for the different wall sections.

Gas spring assembly 200 is shown in FIG. 2 as being of another embodiment of a rolling lobe-type gas spring. In the exemplary embodiment shown, end plate 220 is operative as one end member of the gas spring assembly and rigid wall 212 is operative as a second end member or piston of the gas spring assembly. Gas spring assembly 200, however, is shown in FIG. 2 in an extended position, rather than the having the elastomeric wall portion disposed along the side wall portion, as is shown in FIG. 1, for example.

Figure 3:
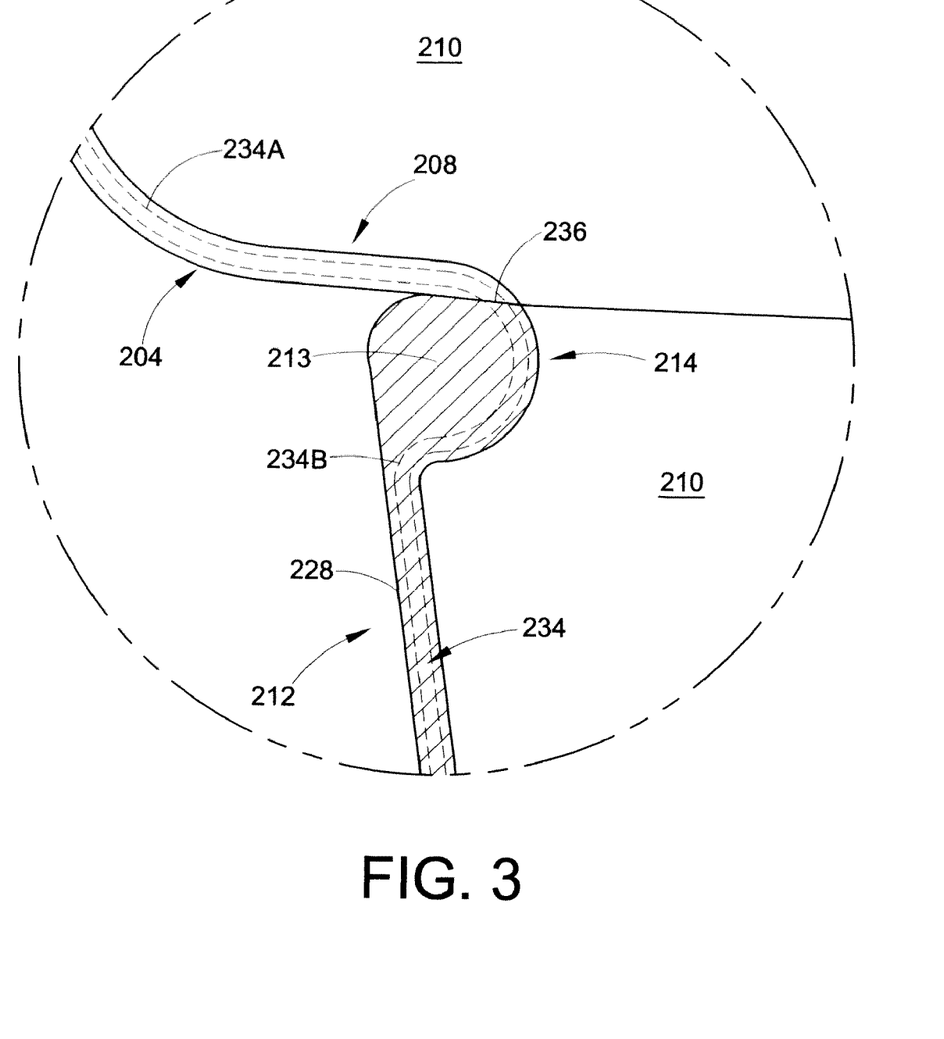
FIG. 3 is an enlarged cross-sectional view of the portion of the gas spring assembly shown in Detail 3 of FIG. 2.

FIG. 3 illustrates a seam or connection between adjacent wall sections, such as seam 236 between end 208 of elastomeric wall section 204 and end 214 of rigid wall section 212, for example. It will be appreciated that FIG. 3 is also representative of the exemplary seams or connections between the adjacent wall sections in the embodiment of FIG. 1. Accordingly, as discussed above with regard to seams 146 and 148, for example, it is desirable to form or otherwise establish a substantially fluid-tight seal between the adjacent wall sections of a spring body in accordance with the present disclosure. Again, it will be appreciated that such a substantially fluid-tight seal can be formed or otherwise provided in any suitable manner. For example, such adjacent wall sections could be formed in approximately abutting engagement with one another and a sealing compound, such as a sealant, adhesive and/or epoxy, for example, could be disposed along the approximately abutting areas to form a substantially fluid-tight seal therebetween. As another example, the wall sections could be formed from a common family of materials (e.g., two different grades of the same polymeric material) with one wall section being molded (or otherwise formed) onto another wall section, such that the complimentary materials melt together during the molding process (or other operation) to thereby adhere the materials together and form a substantially fluid-tight seal therebetween.

Figure 4:
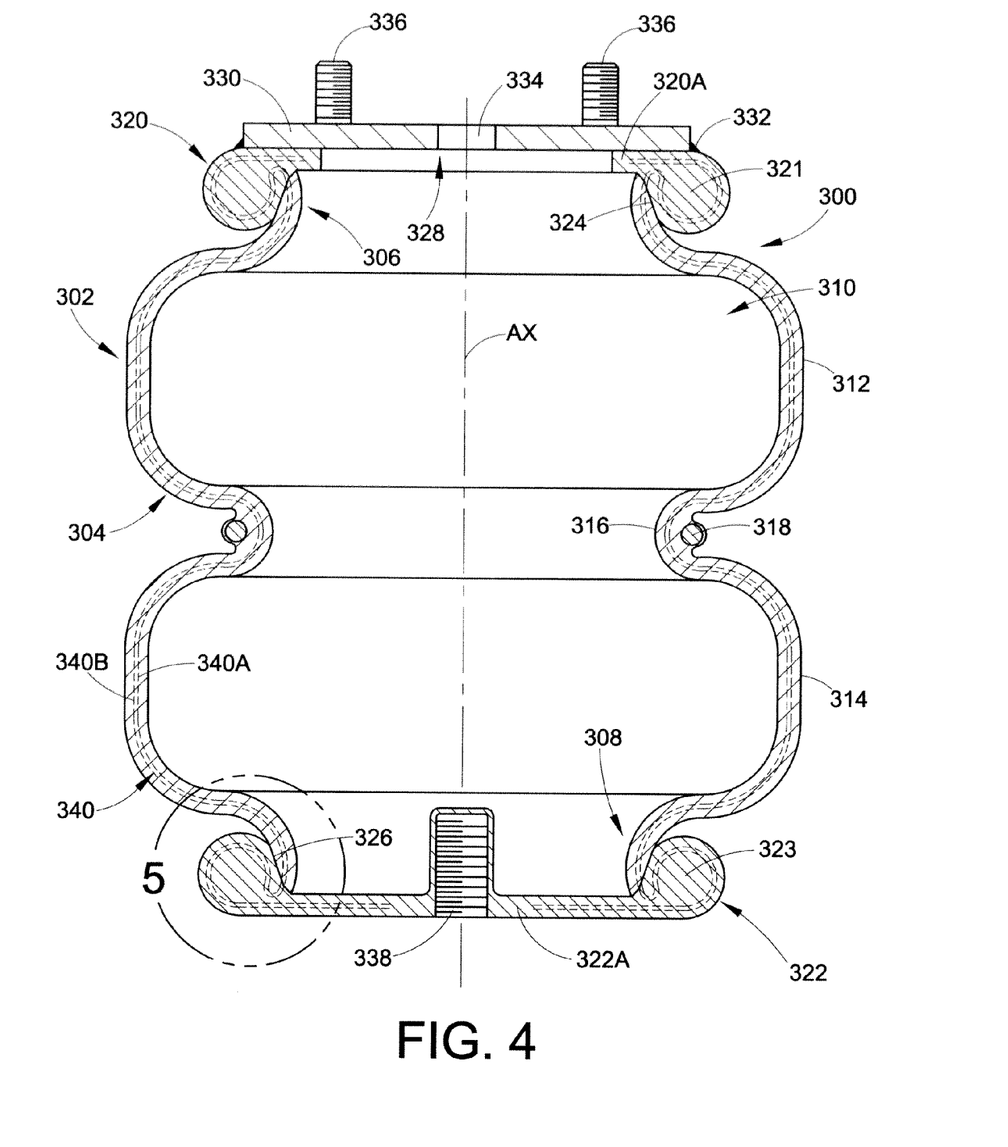
FIG. 4 is a cross-sectional side view of a further exemplary embodiment of a gas spring assembly in accordance with the present novel concept.
Figure 5:
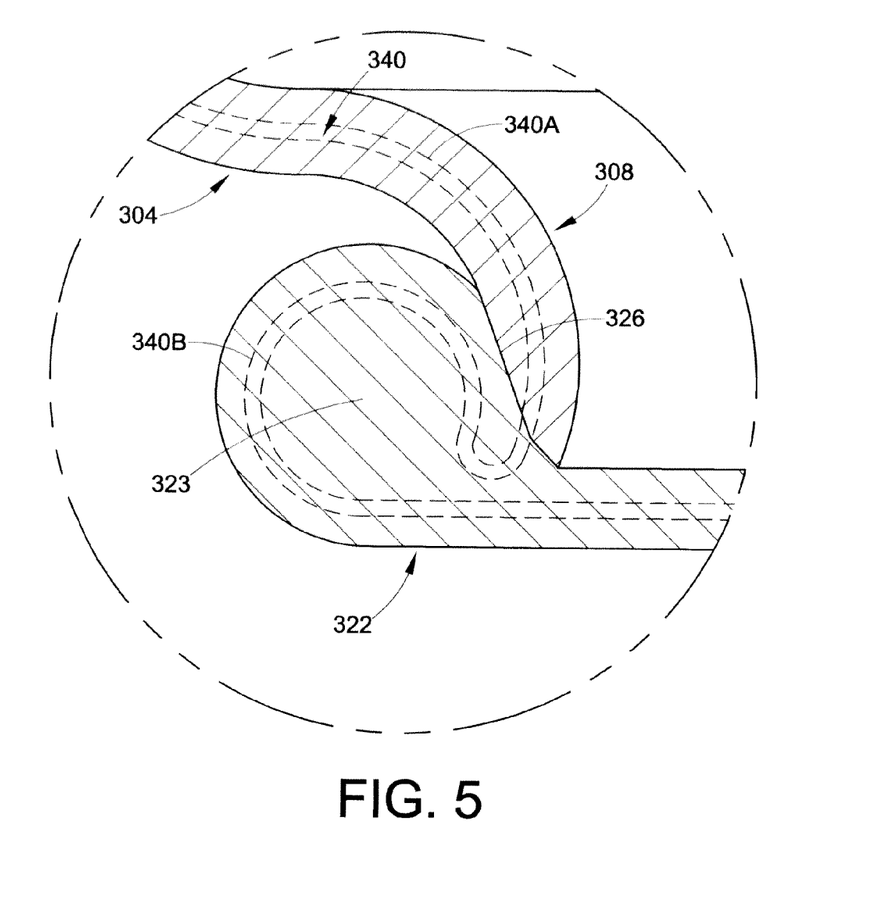
FIG. 5 is an enlarged cross-sectional view of the portion of the gas spring assembly shown in Detail 5 of FIG. 4.

Still another exemplary embodiment of a gas spring assembly 300 that includes a spring body 302 in accordance with the present disclosure is shown in FIGS. 4 and 5. Generally, gas spring assembly 300 is similar to gas spring assembly 100 in that both exemplary embodiments are shown as including an elastomeric wall disposed generally between opposing rigid walls with a filament structure extending into at least a portion of the elastomeric wall and at least a portion of at least one of the rigid walls. Gas spring assembly 300 differs from gas spring assembly 100, however, in that gas spring 300 is of a convoluted bellows-type construction rather than of a rolling lobe-type construction, as will be apparent to one of skill in the art.

As shown in FIGS. 4 and 5, spring body 302 includes an elastomeric wall 304 (which may alternately be referred to herein as a wall portion and/or wall section) that extends generally longitudinally between first and second elastomeric wall ends 306 and 308, such that a central axis AX can be established therebetween. Elastomeric wall section 304 extends circumferentially about axis AX and at least partially defines a spring chamber 310. As mentioned above, gas spring assembly 300 is of a convoluted bellows-type construction that includes an elastomeric wall having at least one convolution formed therealong. In the exemplary embodiment shown in FIGS. 4 and 5, elastomeric wall 304 of spring body 302 is shown as including convolutions 312 and 314 disposed between wall ends 306 and 308 with an intermediate portion 316 having a reduced diameter formed between the convolutions. Optionally, a bead wire 318 or other similar feature or component can be disposed along elastomeric wall 304 between the convolutions.

Spring body 302 also includes a first rigid wall 320 (which may alternately be referred to herein as a wall portion and/or wall section) that is disposed along first elastomeric wall end 306 such that elastomeric wall 304 and first rigid wall 320 at least approximately abut one another along first elastomeric wall end 306. Spring body 302 further includes a second rigid wall 322 (which may alternately be referred to herein as a wall portion and/or wall section) that is disposed along second elastomeric wall end 308 such that elastomeric wall 304 and second rigid wall 322 at least approximately abut one another along second elastomeric wall end 308.

As discussed above with regard to other embodiments, it is desirable for any seams or connections between adjacent wall sections, such as a seams 324 and 326 which are respectively formed between elastomeric wall section 304 and rigid wall sections 320 and 322, to form or establish a substantially fluid-tight seal between the adjacent wall sections. It will be appreciated that such a substantially fluid-tight seal can be formed in any suitable manner. For example, such adjacent wall sections can be proximal to or in abutting engagement with one another and a sealing compound, such as a sealant, adhesive and/or epoxy, for example, could be disposed along the proximal or abutting areas to form a substantially fluid-tight seal therebetween. As another example, the wall sections could be formed from a common family of materials (e.g., two different grades of the same polymeric material) with one wall section being molded (or otherwise formed) onto another wall section, such that the complimentary materials melt together during the molding process (or other operation) to thereby adhere the materials together and form a substantially fluid-tight seal therebetween.

As has also been discussed with regard to other exemplary embodiments, the rigid wall sections can include features suitable for operation of the rigid wall sections as end members of a gas spring assembly. Alternately, one or more additional components and/or elements can be included for use as an end member of the gas spring assembly. In the exemplary embodiment shown, rigid wall section 320 includes an opening 328 formed therethrough. As such, an additional structural component, such as a cover or end plate 330, for example, can be included for use as an end member for engaging an associated structural component, such as structural component SC1 in FIG. 1, for example. In the exemplary embodiment shown, end plate 330 is positioned across opening 328 in rigid wall section 320 and can be secured thereto in any manner suitable for forming a substantially fluid-tight seal therewith, such as by using a welded joint 332, for example. End plate 330 can optionally include one or more additional features and/or components, such as a fluid passage 334 formed therethrough for permitting fluid communication with spring chamber 310, for example. Additionally, end plate 330 can optionally include one or more securement features, such as threaded studs 336, for example.

With regard to the opposing end member of gas spring assembly 300, second rigid wall section 322 forms a closed end of the spring body. As such, the second rigid wall section is adapted to operate as an opposing end member. One of more additional features or elements can optionally be included on or along second rigid wall section 322. For example, a threaded hole 338 can be included, such as may be suitable for receiving a threaded fastener (not shown) for securement of the second rigid wall section on or along an associated structural component, such as structural component SC2 of FIG. 1, for example.

As discussed above with regard to spring body 102, spring body 302 also includes a filament structure that extends within at least a portion of the elastomeric wall section and within at least a portion of at least one rigid wall section. In the exemplary embodiment shown in FIGS. 4 and 5, a filament structure 340 is disposed within elastomeric wall section 304 and extends from first and second elastomeric ends 306 and 308 into rigid wall section 320 and 322, respectively. As shown in FIGS. 4 and 5, filament structure 340 extends the full length of elastomeric wall section 304 but extends only partially along the length of rigid wall sections 320 and 322, such that unreinforced portions 320A and 322A are respectively formed therealong. In alternate embodiments, however, the filament structure could optionally extend the fully across or otherwise along the full length or width of one or more of the rigid wall sections. The gas spring assembly or spring body thereof can also optionally include a suitable radius-maintaining feature or component, such as has been discussed above, for example. In the exemplary embodiment shown in FIGS. 4 and 5, rigid wall sections 320 and 322 respectively include radius-maintaining beads 321 and 323 disposed along an outer peripheral portion of the wall sections. During use, the elastomeric wall section of the spring body can deflect around such a radius-maintaining feature or component, if provided, to thereby prevent the elastomeric wall section from exceeding the desired minimum bend radius.

Additionally, as discussed above with regard to filament structure 144, filament structure 340 can be of any suitable type, kind, construction (e.g., with or without overlaps or filament structure seams) and/or configuration, and can be formed from any suitable material or combination of materials that are capable of forming a filament structure for reinforcing at least portions of the spring body. What's more, filament structure 340 can be formed from any number of one or more filaments that are wound or otherwise disposed in any suitable arrangement, shape or having any desired profile, such as a plurality of filaments laid in two or more cross-biased plies 340A and 340B or a single filament wound in a geodesic pattern, for example. Additionally, the one or more filaments that are used to form the filament structure can of any suitable type, construction and/or material, such as monofilament polymeric strands, braided cotton yarn or bundled carbon fibers, for example. Furthermore, such one or more filaments could optionally be coated or otherwise treated, such as to improve adhesion with the elastomeric and/or rigid material, for example.

As has been also discussed above with regard to spring body 102, spring body 302 can be formed from any material or combination of materials that are suitable for providing the desired performance characteristics of the respective wall sections. Thus, a single material could be used with the different wall sections having varying thicknesses and/or other geometric features or characteristics to provide the desired variations in performance. Additionally, or in the alternative, different materials could be used for the different wall sections.

Figure 6:
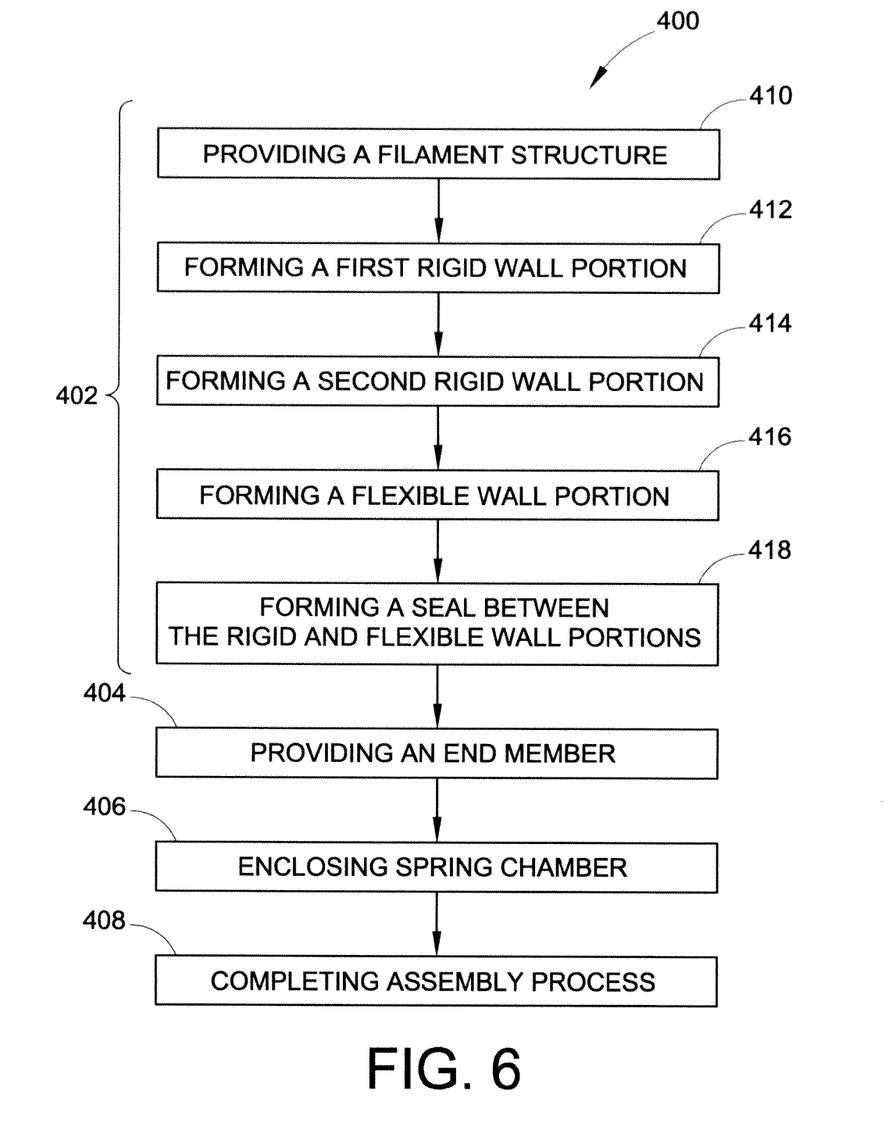
FIG. 6 is a flowchart illustrating one exemplary method of forming a gas spring assembly in accordance with the present novel concept.

One exemplary method of forming a gas spring assembly that includes a spring body in accordance with the present disclosure is illustrated in FIG. 6 as method 400. The method includes providing a spring body that includes at least one elastomeric wall (which may alternately be referred to herein as a wall portion and/or wall section) and at least one rigid wall (which may alternately be referred to herein as a wall portion and/or wall section) as well as a filament structure that extends into or is otherwise disposed within at least a portion of the elastomeric wall and at least a portion of the at least one rigid wall, as is generally indicated by reference number 402 in FIG. 6. Generally, the elastomeric wall will at least partially define a spring chamber within the spring body and the spring body will typically include at least one opening or open end.

Method 400 also includes providing at least one end member or other end closing component, such as one or more of covers or end plates 124, 136, 220 and/or 330, for example, that is suitable for enclosing an open end of the spring body, as is generally indicated by reference number 404. Method 400 further includes securing the end member along the open end of the spring body to enclose a spring chamber that is at least partially defined by the spring body, as is generally indicated by reference number 406. It will be appreciated that such an action of securing an end member can include any suitable actions, processes and/or operations, such as forming a weld joint or forming a mechanical (e.g., threaded or crimped) or adhesive connection. Method 400 can also optionally include additional actions directed toward the production of a final gas spring assembly, as is generally indicated by reference number 408. Such optional actions could include, for example, installing additional components (e.g., gas line connector fittings or securement devices).

Furthermore, it will be appreciated that any suitable actions, processes, operations and/or methods can be used to form a spring body in accordance with the present disclosure. In the exemplary arrangement shown in FIG. 6, action or method 402 includes providing a filament structure, such as filament structure 144, 234 and/or 340, for example, as is generally indicated by reference number 410. Method 402 also includes forming at least one rigid wall along the filament structure, as is generally indicated by item number 412. Method 402 can optionally include forming one or more additional rigid walls along the filament structure, such as along an opposing end thereof, for example, as is generally indicated by item number 414. Furthermore, method 402 includes forming a wall along the filament structure that is elastomeric or otherwise substantially more flexible than the one or more rigid walls, as is generally indicated by item number 416. It will be appreciated that any suitable arrangement of rigid and elastomeric walls can be used, such as by positioning walls adjacent to one another or in abutting engagement to one another, for example. Method 402 also includes forming a substantially fluid-tight seal between adjacent, proximal and/or abutting areas of the walls, as is generally indicated by reference number 418. It will be appreciated that such an action of sealing or forming a seal can include any suitable processes or operations, such as, for example, by molding the walls in abutting engagement with one another or by forming a seal therebetween using a flowable material, such as an adhesive, epoxy or polymeric resin, for example.

As used herein with reference to certain elements, components, structures (e.g., "first end member" and "second end member") and/or actions, numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring body comprising:
   a one-piece filament structure formed from at least one length of filament material that is disposed in a predetermined arrangement such that said filament structure extends circumferentially about a longitudinally-extending axis formed between opposing ends of said filament structure;
   a flexible wall at least partially defining a spring chamber and including inner and outer wall surfaces, said flexible wall formed from a quantity of elastomeric material with a first portion of said filament structure embedded in said flexible wall between said inner and outer wall surfaces thereof; and,
   a substantially-rigid wall including inner and outer wall surfaces, said substantially-rigid wall formed from a quantity of comparatively-rigid material that is different from said elastomeric material with a second portion of said filament structure embedded in said comparatively-rigid material of said substantially-rigid wall between said inner and outer wall surfaces thereof;
   said flexible wall and said substantially-rigid wall abuttingly engaging one another such that a one-piece gas spring body is formed thereby with a substantially fluid-tight seal formed between said flexible wall and said substantially-rigid wall.

2. A gas spring body according to claim 1, wherein said first portion of said filament structure is disposed between said opposing ends and spaced axially inwardly therefrom with said second portion of said filament structure disposed axially outwardly from said first portion and including one of said opposing ends.

3. A gas spring body according to claim 2, wherein said substantially-rigid wall is a first substantially-rigid wall formed from a first quantity of comparatively-rigid material, said filament structure includes a third portion disposed axially-outwardly from said first portion in a direction opposite said second portion, and said gas spring body further comprises a second substantially-rigid wall that includes inner and outer surfaces and is formed from a second quantity of comparatively-rigid material that is different from said elastomeric material with said third portion of said filament structure embedded in said comparatively-rigid material of said second substantially-rigid wall between said inner and outer wall surfaces thereof.

4. A gas spring body according to claim 3, wherein said first and second substantially-rigid walls are formed from a common material.

5. A gas spring body according to claim 1, wherein said one-piece filament structure includes a plurality of filament structure portions connected to one another to form said one-piece filament structure.

6. A gas spring body according to claim 5, wherein said plurality of filament structure portions overlap one another to form seams along which said plurality of filament structure portions are connected to one another.

7. A gas spring body according to claim 1, wherein said flexible wall defines a first portion of said spring chamber and said substantially-rigid wall defines a second portion of said spring chamber that is in fluid communication with said first portion of said spring chamber.

8. A gas spring assembly comprising:
a one-piece gas spring body having a longitudinally-extending axis and extending longitudinally between opposing first and second ends, said one-piece gas spring body including:
a one-piece filament structure formed from at least one length of filament material that is disposed in a predetermined arrangement such that said filament structure extends circumferentially about said axis and has longitudinally-spaced first and second ends;
a flexible wall at least partially defining a spring chamber and including inner and outer wall surfaces, said flexible wall formed from a quantity of elastomeric material with a first portion of said elastomeric material of said filament structure embedded within at least a portion of said flexible wall; and,
a first substantially-rigid wall including inner and outer wall surfaces, said first substantially-rigid wall formed from a first quantity of comparatively-rigid material with a second portion of said filament structure embedded within at least a portion of said comparatively-rigid material of said first substantially-rigid wall;
said flexible wall and said substantially-rigid wall abuttingly engaging one another such that said one-piece gas spring body is at least partially formed thereby with a substantially fluid-tight seal formed between said flexible wall and said substantially-rigid wall;
said flexible wall portion of said one-piece gas spring body disposed toward said first end thereof with said substantially-rigid wall disposed toward said second end of said one-piece gas spring body and at least partially defining a first end member of said gas spring assembly; and,
a second end member operatively connected across said first end of said one-piece gas spring body such that a substantially fluid-tight seal is formed therewith.

9. A gas spring assembly according to claim 8, wherein said filament structure includes a third portion disposed adjacent said first portion in a direction opposite said second portion, and said gas spring body includes a second substantially-rigid wall having said third portion of said filament structure at least partially embedded within a portion of said comparatively-rigid material of said second substantially-rigid wall.

10. A gas spring assembly according to claim 9, wherein said second substantially-rigid wall at least partially defines an open end across said first end of said gas spring body and said second end member is connected to said second substantially-rigid wall such that a substantially fluid-tight seal is formed therebetween.

11. A gas spring assembly according to claim 8, wherein said first substantially-rigid wall of said gas spring body forms a closed end of said spring chamber along said second end of said gas spring body.

12. A gas spring assembly according to claim 8, wherein said flexible wall of said gas spring body forms an open end across said first end of said gas spring body and said second end member is connected to said flexible wall such that a substantially fluid-tight seal is formed therebetween.

13. A method of forming a gas spring body, said method comprising:
a) generating a one-piece filament structure from at least one length of filament material that is disposed in a predetermined arrangement such that said filament structure extends circumferentially about a longitudinally-extending axis and has first and second axially-spaced ends;
b) forming a flexible wall of said gas spring body over a first portion of said one-piece filament structure from a quantity of elastomeric material, said flexible wall at least partially defining a spring chamber and including opposing inner and outer wall surfaces with said first portion of said filament structure embedded within said elastomeric material between said opposing inner and outer wall surfaces and operative to reinforce said flexible wall of said gas spring body; and,
c) forming a rigid wall of said gas spring body over a second portion of said one-piece filament structure and in abutting engagement with said flexible wall such that substantially fluid-tight seal is formed between said flexible wall and said rigid wall, said rigid wall being formed from a quantity of substantially-rigid material, said rigid wall including opposing inner and outer wall surfaces with said second portion of said filament structure embedded within said substantially-rigid material between said opposing inner and outer wall surfaces and operative to reinforce said rigid wall of said gas spring body.

14. A method according to claim 13, wherein generating said filament structure in a) includes winding said filament structure from at least one length of rubber-coated filament material.

15. A method according to claim 14, wherein forming a flexible wall in b) includes applying at least one rubber layer over said filament structure and vulcanizing said at least one rubber layer together with said rubber-coated filament material that forms said filament structure.

16. A method according to claim 13, wherein forming said rigid wall in c) includes molding a quantity of substantially rigid polymeric material over said filament structure, said substantially rigid polymeric material being selected from a group consisting of fiber-reinforced plastic and high-strength unreinforced plastic.

17. A method according to claim 13, wherein forming said flexible wall in b) includes molding a quantity of thermoplastic elastomer over said filament structure.

18. A method of manufacturing a gas spring assembly, said method comprising:
a) generating a one-piece filament structure from at least one length of filament material that is disposed in a pre-determined arrangement such that said filament structure has a longitudinally-extending central axis and extends circumferentially about said axis and longitudinally between opposing first and second structure ends:
b) forming a first rigid wall over a first portion of said filament structure from a first quantity of substantially-rigid material such that said first portion of said filament structure is embedded within said first rigid wall, said first rigid wall operative to at least partially form a first end member of said gas spring assembly and including an inner wall surface and an outer wall surface;

c) forming a elastomeric wall over a second portion of said filament structure from a quantity of flexible material such that said second portion of said filament structure is embedded within said elastomeric wall, said elastomeric wall at least partially defining a spring chamber and an open end opposite said first rigid wall;

d) forming a substantially fluid-tight seal between said first rigid wall and said elastomeric wall; and, e) enclosing said spring chamber to form a substantially fluid-tight volume within said gas spring assembly.

19. A method according to claim 18, wherein e) includes providing a second end member, and securing said second end member along said open end of said elastomeric wall such that a substantially fluid-tight seal is formed therealong.

20. A method according to claim 19 further comprising forming a second rigid wall over a third portion of said filament structure from a second quantity of substantially-rigid material such that said third portion of said filament structure is embedded within said second rigid wall, forming a substantially fluid-tight seal between said second rigid wall and said elastomeric wall with said second rigid wall being disposed adjacent said elastomeric wall opposite said first rigid wall.

21. A method according to claim 20, wherein securing said second end member along said open end of said elastomeric wall includes securing said second end member on said second rigid wall and forming said substantially fluid-tight seal therewith.

22. A method according to claim 18, wherein e) includes providing an end wall and securing said end wall along said first rigid wall such that a substantially fluid-tight seal is formed therewith.

23. A method according to claim 18, wherein c) is performed prior to b) and d) is performed at substantially the same time as b).

24. A method according to claim 18, wherein e) includes forming a second rigid wall over a third portion of said filament structure from a second quantity of substantially-rigid material such that said third portion of said filament structure is embedded within said second rigid wall, and forming a substantially fluid-tight seal between said elastomeric wall and said second rigid wall with said second rigid wall operative as said second end member of said gas spring assembly.

* * * * *